US012609404B2

(12) United States Patent
Lee

(10) Patent No.: US 12,609,404 B2
(45) Date of Patent: Apr. 21, 2026

(54) BATTERY CELL AND BATTERY MODULE COMPRISING THE SAME

(71) Applicant: SK On Co., Ltd., Seoul (KR)

(72) Inventor: Jong Hyeok Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 575 days.

(21) Appl. No.: 18/075,918

(22) Filed: Dec. 6, 2022

(65) Prior Publication Data

US 2023/0198081 A1    Jun. 22, 2023

(30) Foreign Application Priority Data

Dec. 20, 2021    (KR) ........................ 10-2021-0182993

(51) Int. Cl.
*H01M 50/30*     (2021.01)
*H01M 50/105*    (2021.01)
*H01M 50/183*    (2021.01)
*H01M 50/505*    (2021.01)
*H01M 50/533*    (2021.01)

(52) U.S. Cl.
CPC ......... *H01M 50/30* (2021.01); *H01M 50/105* (2021.01); *H01M 50/183* (2021.01); *H01M 50/505* (2021.01); *H01M 50/533* (2021.01)

(58) Field of Classification Search
CPC ... H01M 50/30; H01M 50/105; H01M 50/133
See application file for complete search history.

(56) References Cited

U.S. PATENT DOCUMENTS

| | | | |
|---|---|---|---|
| 6,391,491 | B1 | 5/2002 | Kim |
| 2017/0018746 | A1 | 1/2017 | Kritzer et al. |
| 2018/0241023 | A1* | 8/2018 | Lim .................... H01M 50/178 |
| 2021/0135180 | A1 | 5/2021 | Kang |
| 2022/0131229 | A1 | 4/2022 | Chi et al. |

FOREIGN PATENT DOCUMENTS

| | | |
|---|---|---|
| EP | 3118910 A1 | 1/2017 |
| KR | 10-0369069 B1 | 1/2003 |
| KR | 10-2016-0106932 A | 9/2016 |
| KR | 10-2018-0001190 A | 1/2018 |
| KR | 10-2020-0113849 A | 10/2020 |
| KR | 10-2021-0051733 A | 5/2021 |
| KR | 10-2021-0088172 A | 7/2021 |

OTHER PUBLICATIONS

Extended European Search Report for the European Patent Application No. 22212608.8 issued by the European Patent Office on Apr. 18, 2023.
Office Action for Korean Patent Application No. 10-2021-0182993 issued by the Korean Patent Office on Nov. 7, 2025.

* cited by examiner

*Primary Examiner* — Kenneth J Douyette
(74) *Attorney, Agent, or Firm* — IP & T GROUP LLP

(57) ABSTRACT

A battery cell includes a case; an electrode assembly including a positive electrode, a negative electrode, and a separator, accommodated in the case; and a venting guide member having a guide groove therein into which a sealing portion of the case is at least partially inserted, and pressing the case to delay opening of the case.

8 Claims, 12 Drawing Sheets

130

133

134

133

Y
X
Z

BATTERY CELL AND BATTERY MODULE COMPRISING THE SAME

CROSS-REFERENCE TO RELATED APPLICATIONS

This application claims benefit of priority to Korean Patent Application No. 10-2021-0182993 filed on Dec. 20, 2021 in the Korean Intellectual Property Office, the disclosure of which is incorporated herein by reference in its entirety.

BACKGROUND

1. Field

The present disclosure relates to a battery cell and a battery module including the same.

2. Description of Related Art

A battery cell is a cell capable of being charged and discharged, and has a wide application range, including relatively small portable electronic devices, mid-sized to large-sized automobiles, and power storage devices.

The battery cell may have a configuration in which a stack body including a positive electrode, a negative electrode, and a separator is disposed in a case and an electrolyte is filled and sealed in the case. The case of the battery cell may have various shapes, such as a pouch shape, a square shape, a round shape, and the like. When a plurality of battery cells are electrically connected to form a battery module, capacity and an output amount of the battery module may further increase.

When the charging and discharging process of the battery cell are repeated, gas by the electrolyte may be generated inside the case. The gas may be accommodated inside the case, and when pressure therein is higher than a certain level, a sealing portion of the case may be released, and the gas may be discharged to the outside of the case.

Accordingly, timing of releasing sealing of the case, a position in which the sealing is first released from the case, a shape of an unsealing portion of the case, or the like may be controlled by a method of regulating the pressure of the gas inside the case.

(Patent Document 1) KR 10-0369069 B1 (2003 Jan. 9)

SUMMARY

An object of the present disclosure is to increase gas-accommodating capacity of a case of a battery cell.

Another object of the present disclosure is to delay unsealing of a case of a battery cell by gas.

According to an aspect of the present disclosure, a battery cell includes a case; an electrode assembly including a positive electrode, a negative electrode, and a separator, accommodated in the case; and a venting guide member having a guide groove therein into which a sealing portion of the case is at least partially inserted, and pressing the case to delay opening of the case.

In an embodiment, the electrode assembly may further include a positive electrode tab connected to the positive electrode and drawn out of the case in one direction; and a negative electrode tab connected to the negative electrode and drawn out of the case in a direction, different from the one direction of the positive electrode tab, wherein the sealing portion of the case may include a first sealing portion formed on a surface of the case from which the positive electrode tab is drawn out; and a second sealing portion formed on a surface of the case from which the negative electrode tab is drawn out, wherein the venting guide member may be coupled to the case, to insert at least one of the first sealing portion or the second sealing portion into the guide groove.

Also, in an embodiment, the venting guide member may be coupled to the case such that a region thereof at least partially faces at least one of the positive electrode tab or the negative electrode tab.

In addition, in an embodiment, the venting guide member may be coupled to the case such that end portions of the venting guide member are present on the case in a cross-section taken in a width-height direction of the case.

Also, in an embodiment, the plurality of venting guide members may be spaced apart from each other to sandwich the positive electrode tab and the negative electrode tab therebetween, and may be coupled to the case.

In addition, in an embodiment, in the venting guide member, at least a region thereof may face at least one of the positive electrode tab or the negative electrode tab, and end portions of the venting guide member may extend in an outer circumferential direction of the case in a cross-section taken in a width-height direction of the case, such that the end portions may be present outside of the case.

In addition, in an embodiment, the venting guide member may have a pair of the guide groove, and may further include a tab lead-out hole provided therein to be positioned between the pair of guide grooves, and through which at least one of the positive electrode tab or the negative electrode tab passes.

In addition, in an embodiment, the guide groove may have an intermediate forcedly fitting tolerance or a loose forcedly fitting tolerance with the case, and the tab lead-out hole may have an intermediate forcedly fitting tolerance or a loose forcedly fitting tolerance with at least one of the positive electrode tab or the negative electrode tab.

The present disclosure provides a battery module including a battery cell as another aspect.

A battery module according to an embodiment of the present disclosure may include a module housing; at least one battery cell accommodated in the module housing; and a bus bar unit electrically connected to a positive electrode tab and a negative electrode tab of the battery cell, wherein the battery cell may include a case; an electrode assembly accommodated in the case, and including a positive electrode to which the positive electrode tab is connected, a negative electrode to which the negative electrode tab is connected, and a separator interposed between the positive electrode and the negative electrode; and a venting guide member having a guide groove therein into which a sealing portion of the case is at least partially inserted, and pressing the case to delay opening of the case.

Also, in an embodiment, the battery cell may be seated in the module housing such that the case does not contact the module housing.

Also, in an embodiment, the venting guide member may be in contact with the module housing.

In addition, in an embodiment, the venting guide member may have a pair of the guide groove, and may further include a tab lead-out hole provided therein to be positioned between the pair of guide grooves, and through which at least one of the positive electrode tab or the negative electrode tab passes.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
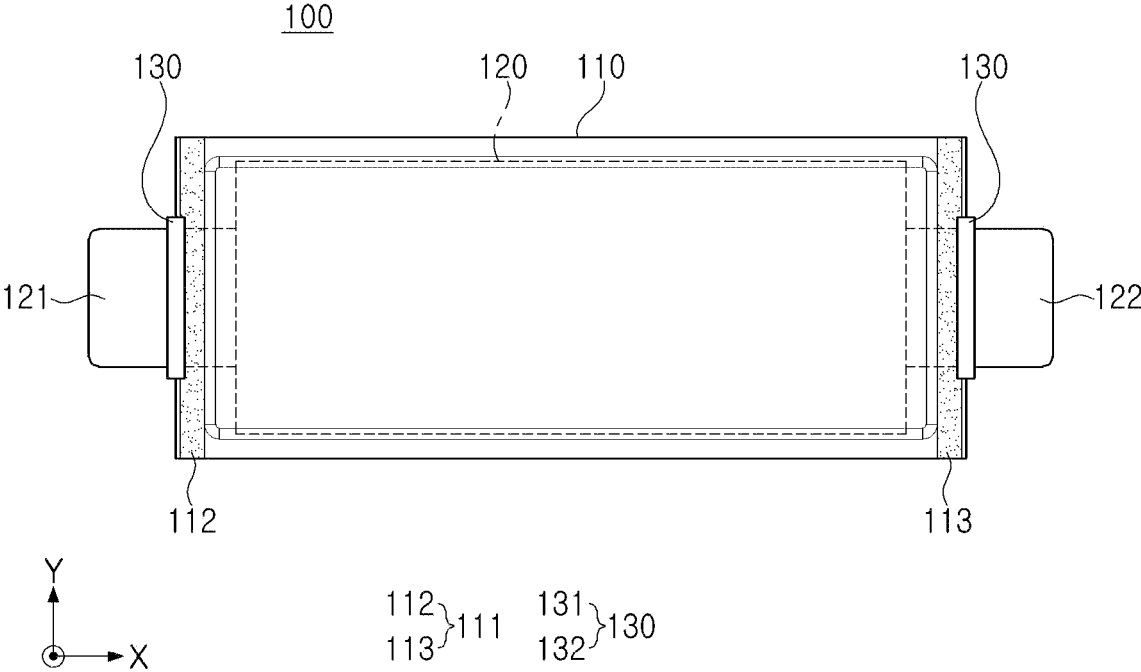
FIG. 1 schematically illustrates a battery cell according to an embodiment of the present disclosure.

In order to help understanding of a description of embodiments of the present disclosure, elements indicated with the same reference numerals in the accompanying drawings are the same elements, and related elements among the elements that perform the same action in each embodiment are denoted by the same or related numerals.

In addition, in order to clarify a gist of the present disclosure, a description of elements and techniques well known in the prior art will be omitted, and hereinafter, the present disclosure will be described in detail with reference to the accompanying drawings.

However, it can be understood that the spirit of the present disclosure is not limited to embodiments to be provided, and specific components may be proposed in other forms in which specific elements are added, changed, or deleted by those skilled in the art, but this is also included within the scope of the same spirit as the present disclosure.

Hereinafter, as illustrated in the accompanying drawings, an X-axis is a width direction of a battery cell, a Y-axis is a height direction of the battery cell, and a Z-axis is a thickness direction of the battery cell.

FIG. 1 schematically illustrates a battery cell 100 according to an embodiment of the present disclosure.

As illustrated in FIG. 1, a battery cell 100 may include a case 110 having a pouch shape, and the case 110 may accommodate at least one electrode assembly 120 and an electrolyte therein.

A positive electrode tab 121 connected to a positive electrode (not illustrated) of the electrode assembly 120 and a negative electrode tab 122 connected to a negative electrode (not illustrated) of the electrode assembly 120 may be drawn out of the case 110, and a lead film (not illustrated) may be present between the positive electrode tab 121 and the case 110 and between the negative electrode tab 122 and the case 110 in a thickness direction of the case 110.

An outer surface of the case 110 may be formed of a material containing an aluminum alloy, and an inner surface of the case 110 may be formed of a material containing polypropylene. The case 110 may be heat-sealed to seal a space in which the electrode assembly 120 and the electrolyte are accommodated.

In an embodiment of the present disclosure, the case 110 may be heat-sealed in a state in which the positive electrode tab 121 and the negative electrode tab 122 are drawn out of the case 110, and a heat-sealed region in the case 110 may become a sealing portion 111. The sealing portion 111 may be present in plurality in the case 110.

The sealing portion 111 may include a first sealing portion 112 formed in a region from which the positive electrode tab 121 is drawn out, and a second sealing portion 113 formed in a region from which the negative electrode tab 122 is drawn out. The sealing portion 111 may further include a third sealing portion (not illustrated) and a fourth sealing portion (not illustrated), formed in a direction, parallel to the X-axis, in addition to the first sealing portion 112 and the second sealing portion 113. However, this is not necessarily limited by the present disclosure, and the number of sealing portions and a region in which the sealing portions are formed may be appropriately selected and applied according to specifications and the like required for the battery cell 100.

The first sealing portion 112 and the second sealing portion 113 may be formed by overlapping and heat sealing of both surfaces of the case 110.

Gas generated by the electrolyte may be accommodated in a space between the first sealing portion 112 and the electrode assembly 120 inside the case 110. In addition, the gas generated by the electrolyte may be accommodated in a space between the second sealing portion 113 and the electrode assembly 120 inside the case 110.

The gas generated by the electrolyte may stay inside the case 110, since the case 110 may be sealed by the first sealing portion 112 and the second sealing portion 113 until a pressure of a certain level is reached. When the pressure of the gas exceeds a bonding force of the case 110 between the first sealing portion 112 and the second sealing portion 113, sealing of the case 110 may be released in the first sealing portion 112 and the second sealing portion 113, to discharge the gas to the outside of the case 110.

In the first sealing portion 112 according to an embodiment of the present disclosure, a bonding force in a region facing the positive electrode tab 121 may be weaker than a bonding force in a region not facing the positive electrode tab 121. In addition, in the second sealing portion 113, a bonding force in a region facing the negative electrode tab 122 may be weaker than a bonding force in a region not facing the negative electrode tab 122.

In this case, since the gas inside the case 110 may be concentrated toward a region in which the positive electrode tab 121 and the negative electrode tab 122 are present, a point in time of unsealing the case 110 may be advanced, compared to when a bonding force of the first sealing portion 112 is equal to a bonding force of the second sealing portion 113 in a direction, parallel to the Y-axis. Therefore, gas-accommodating capacity of the case 110 may be relatively reduced.

According to an embodiment of the present disclosure, a battery cell 100 may include a plurality of venting guide members 130 coupled to the case 110 to press a region of the first sealing portion 112 facing the positive electrode tab 121 and a region of the second sealing portion 113 facing the negative electrode tab 122.

In this case, the plurality of venting guide members 130 may be coupled to the case 110, not to press at least a region of a region of the case 110 not facing the positive electrode tab 121 and at least a region of a region of the case 110 not facing the negative electrode tab 122.

In an embodiment of the present disclosure, a venting guide member 130 may be forcedly fitted and coupled to the case 110. In this case, the positive electrode tab 121 and the negative electrode tab 122 may pass through the venting guide member 130.

The venting guide member 130 forcedly fitted to the case 110 may be in contact with one surface and the other surface of the case 110, respectively, and the one surface and the other surface of the case 110 may be pressed in the thickness direction of the case 110. In this case, a region of the positive electrode tab 121 and a region of the negative electrode tab 122 may also be pressed by the venting guide member 130.

The venting guide member 130 may prevent an additional increase in bonding force of a portion having a relatively strong bonding force in the first sealing portion 112 and the second sealing portion 113, while reinforcing a bonding force of a portion having a relatively weak bonding force. According to the venting guide member 130, the first sealing portion 112 and the second sealing portion 113 may have a uniform bonding force in a direction, parallel to the Y-axis.

In addition, according to the venting guide member 130, since a bonding force of the first sealing portion 112 and a bonding force of the second sealing portion 113 are uniform, a portion of the first sealing portion 112 and a portion of the second sealing portion 113 may be prevented from being unsealed first. Therefore, a point in time at which gas inside the case 110 unseals the case 110 may be delayed, and gas-accommodating capacity of the case 110 may increase.

The venting guide member 130 may be formed of a material including a plastic having a certain level of dielectric strength, but the material is not necessarily limited by the present disclosure, and may be matters that may be appropriately selected and applied according to a usage environment, standards, specifications, or the like of the battery cell 100.

In another embodiment of the present disclosure, a venting guide member 130 may be coupled to the case 110, to press only one sealing portion of the first sealing portion 112 or the second sealing portion 113. This may be appropriately selected and applied in consideration of a bonding characteristic of the first sealing portion 112, a bonding characteristic of the second sealing portion 113, a venting characteristic of the battery cell 100, or the like.

Figure 2:
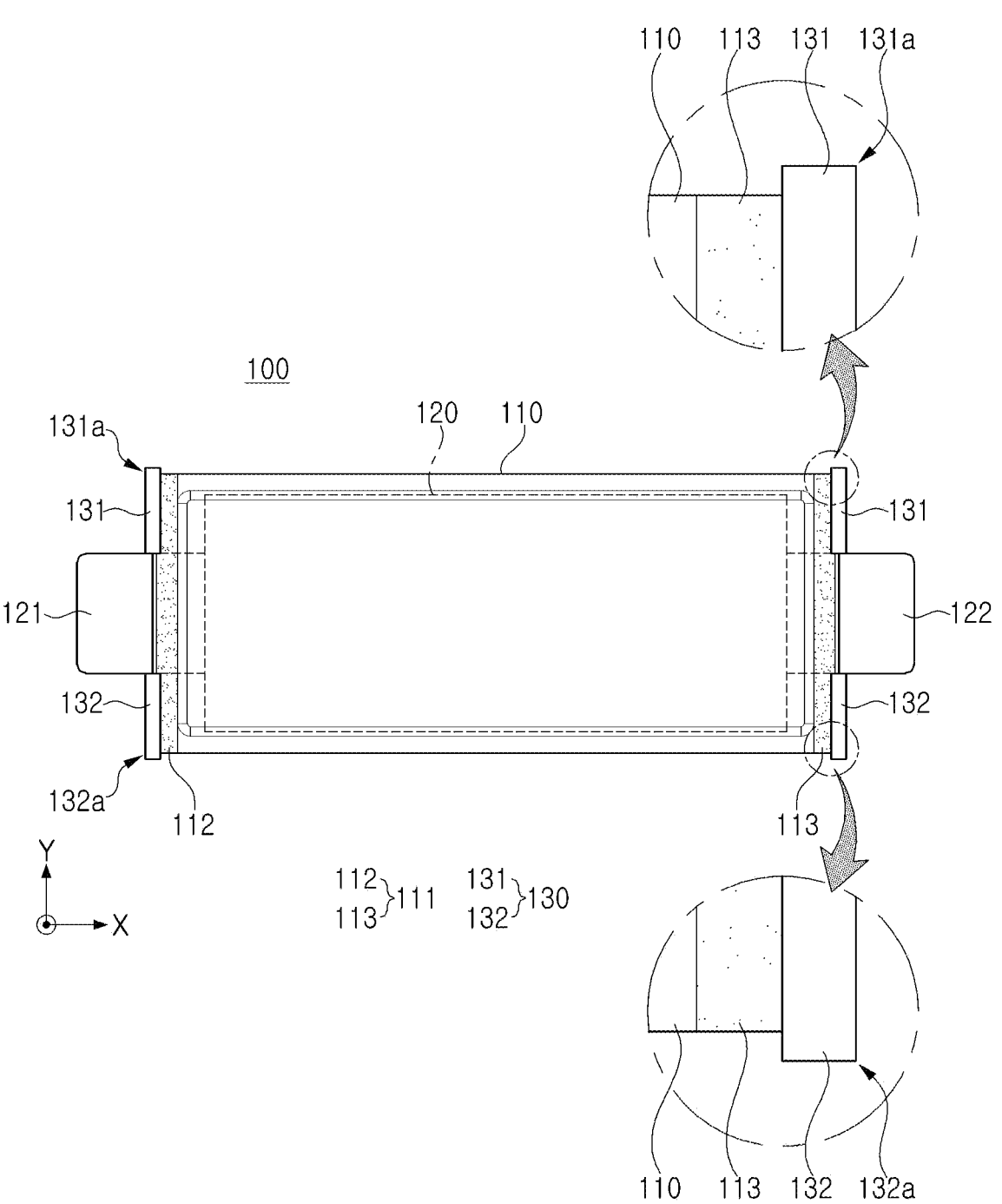
FIG. 2 schematically illustrates a battery cell according to another embodiment of the present disclosure.

FIG. 2 schematically illustrates a battery cell 100 according to another embodiment of the present disclosure.

As illustrated in FIG. 2, in a first sealing portion 112 of a battery cell 100 according to another embodiment of the present disclosure, a bonding force in a region in which a positive electrode tab 121 is not present may be weaker than a bonding force in a region in which the positive electrode tab 121 is present.

Also, in a second sealing portion 113, a bonding force in a region in which a negative electrode tab 122 is not present may be weaker than a bonding force in a region in which the negative electrode tab 122 is present.

In another embodiment of the present disclosure, a venting guide member 130 may be coupled to a case 110, to press a region having a relatively weak bonding force in the first sealing portion 112 and the second sealing portion 113.

In another embodiment of the present disclosure, a venting guide member 130 may include a first venting guide member 131 and a second venting member 132, coupled to the case 110, to cover at least a region of the first sealing portion 112.

The first venting guide member 131 may be present on the positive electrode tab 121 in a +Y direction, and the second venting guide member 132 may be present below the positive electrode tab 121 in a −Y direction. The first venting guide member 131 and the second venting guide member 132 may be spaced apart from each other with the positive electrode tab 121 interposed therebetween.

The first venting guide member 131 and the second venting guide member 132 may be provided in plurality, to also press the second sealing portion 113. In the second sealing portion 113, a first venting guide member 131 may be present on the negative electrode tab 122 in the +Y direction, and a second venting guide member 132 may be present below the negative electrode tab 122 in the −Y direction.

A plurality of first venting guide members 131 and a plurality of second venting guide members 132 may be formed by additionally pressing a region having a relatively weak bonding force in the first sealing portion 112 and the second sealing portion 113. The first sealing portion 112 and the second sealing portion 113 may have uniform bonding force in a direction, parallel to the Y-axis.

In this case, an end portion 131a of the first venting guide member 131 in the +Y direction and an end portion 132a of the second venting guide member 132 in the −Y direction may be present outside the case 110. According to this, the first venting guide member 131 and the second venting guide member 132 may surround a bat ear portion of the case 110.

The bat ear portion may be a region in which particles of the case 110 are concentrated and protrude during a heat-sealing process of the case 110 or a folding process of the case 110, and may be a region from which a portion of an aluminum layer of the case 110 is exposed. The bat ear portion may mainly occur in an outer peripheral region of the case 110. Therefore, when the first venting guide member 131 and the second venting guide member 132 surround the bat ear portion, exposure of the aluminum layer outside the case 110 may be prevented, and breakage of insulation of the case 110 may be prevented.

Figure 3:
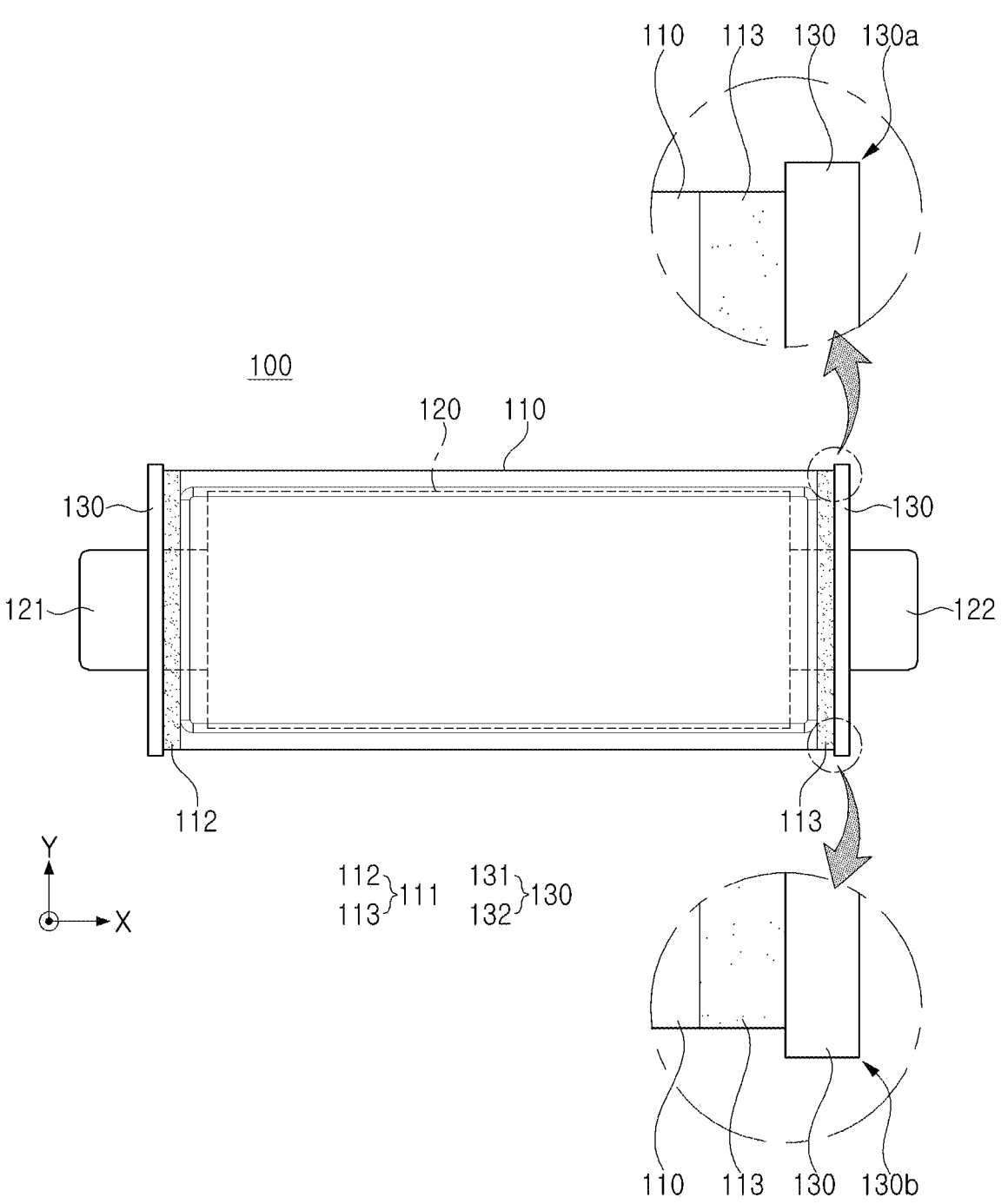
FIG. 3 schematically illustrates a battery cell according to another embodiment of the present disclosure.

FIG. 3 schematically illustrates a battery cell 100 according to another embodiment of the present disclosure.

As illustrated in FIG. 3, a first sealing portion 112 and a second sealing portion 113 of a battery cell 100 according to another embodiment of the present disclosure may have uniform bonding force in a direction, parallel to the Y-axis.

In another embodiment of the present disclosure, a venting guide member 130 may press the first sealing portion 112 and a positive electrode tab 121 on the same line in a direction, parallel to the Y-axis.

In another embodiment of the present disclosure, a plurality of venting guide members 130 may be provided to press the second sealing portion 113 and a negative electrode tab 122 on the same line in a direction, parallel to the Y-axis.

The first sealing portion 112, the positive electrode tab 121, the second sealing portion 113, and the negative electrode tab 122 may be pressed by the venting guide member 130 to uniformly increase a bonding force of the first sealing portion 112 and a bonding force of the second sealing portion 113. Therefore, a point in time at which sealing of a case 110 is released may be delayed, and a time period at which gas is accommodated in the case 110 may increase.

An end portion 130*a* of the venting guide member 130 in a direction, parallel to the Y-axis, may be present outside the case 110, and the other end portion 130*b* of the venting guide member 130 in a direction, parallel to the Y-axis, may be also present outside the case 110. According to this, the above-described bat ear portion may be surrounded by the venting guide member 130, and exposure of an aluminum layer outside the case 110 may be prevented, to contribute to maintaining insulation of the case 110.

Figure 4:
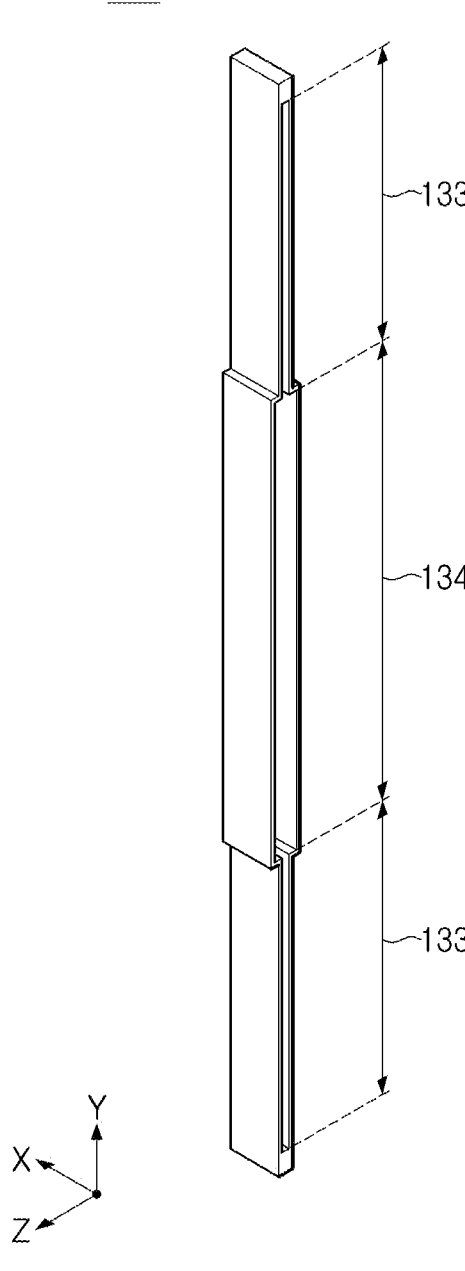
FIG. 4 is a perspective view of a venting guide member according to an embodiment of the present disclosure.

FIG. 4 is a perspective view of a venting guide member 130 according to an embodiment of the present disclosure.

As illustrated in FIG. 4, a venting guide member 130 according to an embodiment of the present disclosure may be provided with a pair of guide grooves 133 therein, and at least a region of a case (110 in FIG. 3) may be inserted into a guide groove 133. The case (110 in FIG. 3) inserted into the guide groove 133 may be pressed by the venting guide member 130.

A tab lead-out hole 134 may be provided between the pair of guide grooves 133 in the Y-axis direction of the venting guide member 130. The tab lead-out hole 134 may be a through-hole formed inside the venting guide member 130, through which a positive electrode tab (121 in FIG. 3) or a negative electrode tab (122 in FIG. 3) may pass, and the positive electrode tab (121 in FIG. 3) or the negative electrode tab (122 in FIG. 3) passing through the tab lead-out hole 134 may be exposed outside the venting guide member 130.

The case (110 in FIG. 3) may be positioned inside the guide groove 133, and may not be exposed outside the venting guide member 130. According to this, a phenomenon of exposing an aluminum layer of the case (110 in FIG. 3) outside the venting guide member 130 to break insulation thereof may be prevented.

The positive electrode tab (121 in FIG. 3) or the negative electrode tab (122 in FIG. 3) may pass through the tab lead-out hole 134, to be exposed outside the venting guide member 130. According to this, the positive electrode tab (121 in FIG. 3) or the negative electrode tab (122 in FIG. 3) may be easily connected to a bus bar (not illustrated).

Figure 5:
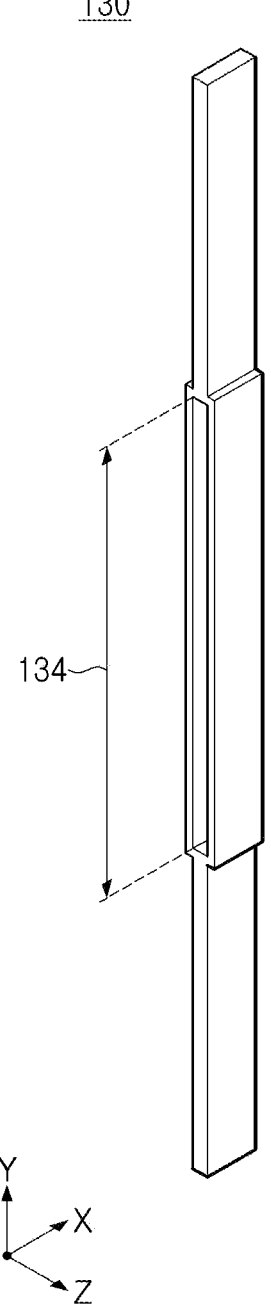
FIG. 5 is a perspective view illustrating the venting guide member of FIG. 4 from another viewpoint.

FIG. 5 is a perspective view illustrating the venting guide member 130 of FIG. 4 from another viewpoint.

As illustrated in FIG. 5, the tab lead-out hole 134 may be a through-hole formed in the venting guide member 130 in a direction, parallel to the X-axis. The positive electrode tab (121 in FIG. 3) or the negative electrode tab (122 in FIG. 3) may be inserted into one side opening of the tab lead-out hole 134, and the positive electrode tab (121 in FIG. 3) or the negative electrode tab (122 in FIG. 3) may be drawn out of the other side opening of the tab lead-out hole 134.

Figure 6:
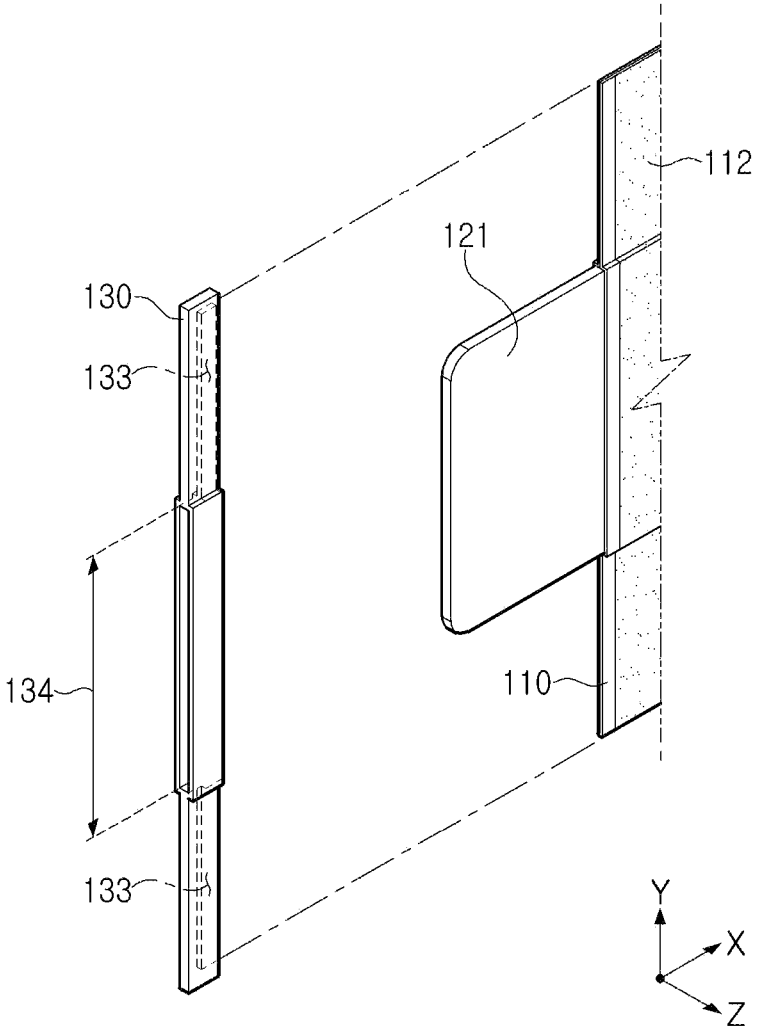
FIG. 6 is an exploded perspective view of a venting guide member and a case according to an embodiment of the present disclosure.

FIG. 6 is an exploded perspective view of a venting guide member 130 and a case 110 according to an embodiment of the present disclosure.

As illustrated in FIG. 6, a positive electrode tab 121 may be inserted into one side opening of a tab lead-out hole 134 and may be drawn out of the other side opening of the tab lead-out hole 134, and at least a region of a case 110 and at least a region of a first sealing portion 112 of the case 110 may be inserted into a guide groove 133.

In an embodiment of the present disclosure, a tab lead-out hole 134 may be provided to have an intermediate forcedly fitting tolerance or a loose forcedly fitting tolerance with a positive electrode tab (121 in FIG. 3) or a negative electrode tab (122 in FIG. 3). In addition, a guide groove 133 may be provided to have an intermediate forcedly fitting tolerance or a loose forcedly fitting tolerance with the case 110. According to this, assembly of the venting guide member 130 and the case 110 may be facilitated, and when the venting guide member 130 is assembled with the case 110, the venting guide member 130 may cause to press the first sealing portion 112.

Even when a region of the case 110 is inserted together into the tab lead-out hole 134, the case 110 may have a relatively thin film. In this case, even though an intermediate forcedly fitting tolerance or a loose forcedly fitting tolerance is formed between the tab lead-out hole 134 and the positive electrode tab 121, the case 110 may be inserted into the tab lead-out hole 134 without unreasonableness within ranges of the tolerance. As necessary, a value obtained by adding a thickness of the case 110 to a thickness of the positive electrode tab 121 may be determined as a thickness of the positive electrode tab 121, and based on the thickness of the positive electrode tab 121 determined in this manner, an intermediate forcedly fitting tolerance or a loose forcedly fitting tolerance with the tab lead-out hole 134 may be formed.

In an embodiment of the present disclosure, a depth at which the case 110 is inserted into the guide groove 133 and a depth at which the positive electrode tab 121 is inserted into the tab lead-out hole 134 may be controlled to adjust an amount of increasing a bonding force of the first sealing part 112.

As the case 110 and the positive electrode tab 121 are inserted more deeply into the guide groove 133 and the tab lead-out hole 134 in the −X direction, a bonding force of the first sealing portion 112 may increase in a relative large amount. As the case 110 and the positive electrode tab 121 are inserted more shallowly into the guide groove 133 and the tab lead-out hole 134 in the −X direction, the bonding force of the first sealing portion 112 may increase in a relative small amount. This may be equally applied to the second sealing portion (113 in FIG. 3) in which the negative electrode tab (122 in FIG. 3) is present.

In an embodiment of the present disclosure, a width of the first sealing portion 112 and a width of the second sealing portion (113 in FIG. 3) in a direction, parallel to the X-axis, may be 5 mm, respectively. In this case, a depth at which the case 110 and the positive electrode tab 121 are inserted into the guide groove 133 and the tab lead-out hole 134 in a direction, parallel to the X-axis, in the first sealing portion 112 may be a value of 1 mm or more and 5 mm or less. This may be equally applied to the negative electrode tab (122 in FIG. 3) and the case 110 in the second sealing portion (113 in FIG. 3).

However, the above numerical values are not necessarily limited by the present disclosure, and may be appropriately selected and applied according to a usage environment of the battery cell 100, specifications required for the battery cell 100, or the like.

Figure 7:
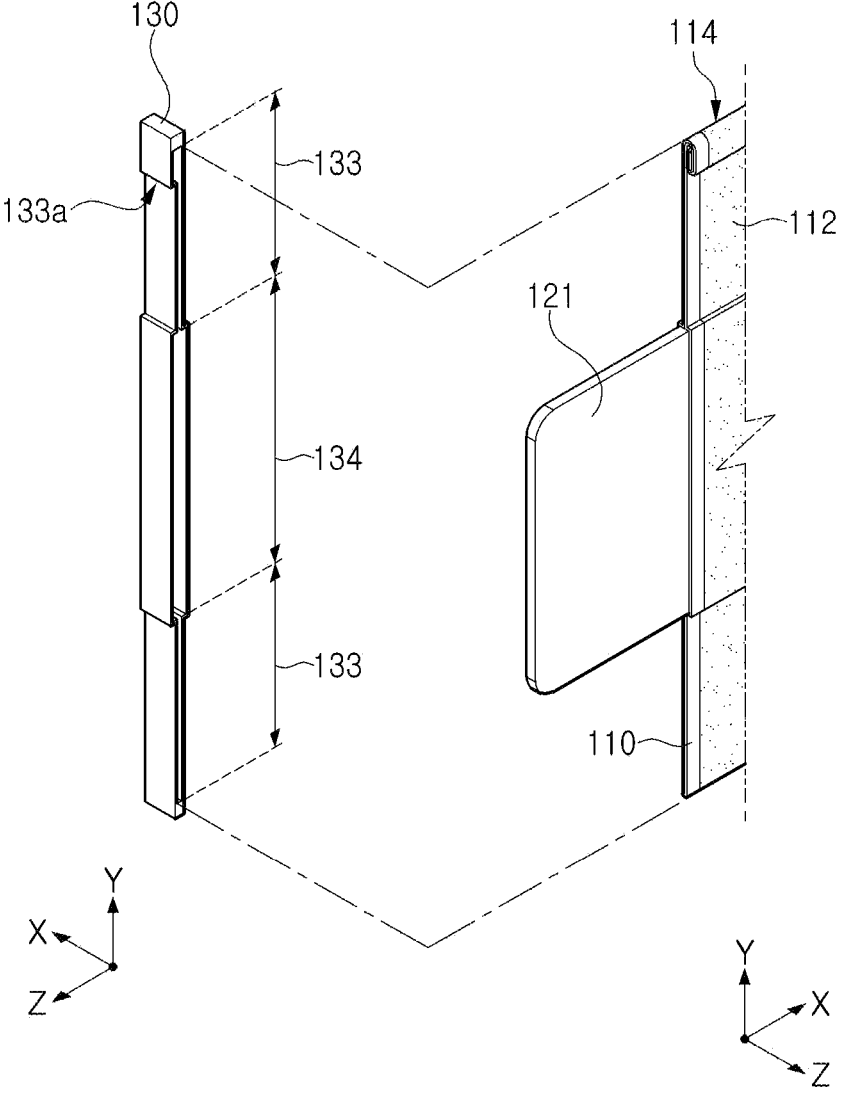
FIG. 7 is an exploded perspective view of a venting guide member and a case according to another embodiment of the present disclosure.

FIG. 7 is an exploded perspective view of a venting guide member 130 and a case 110 according to another embodiment of the present disclosure.

As illustrated in FIG. 7, when a folded portion 114 is formed by rolling one end portion of a case 110, the folded portion 114 may have a protruding shape, compared to other regions of the case 110. Therefore, in another embodiment of the present disclosure, a guide groove 133 may include a folded portion insertion region 133a having a width corresponding to the folded portion 114. The folded portion insertion region 133a may be provided to have an intermediate forcedly fitting tolerance or a loose forcedly fitting tolerance with the folded portion 114.

Figure 8:
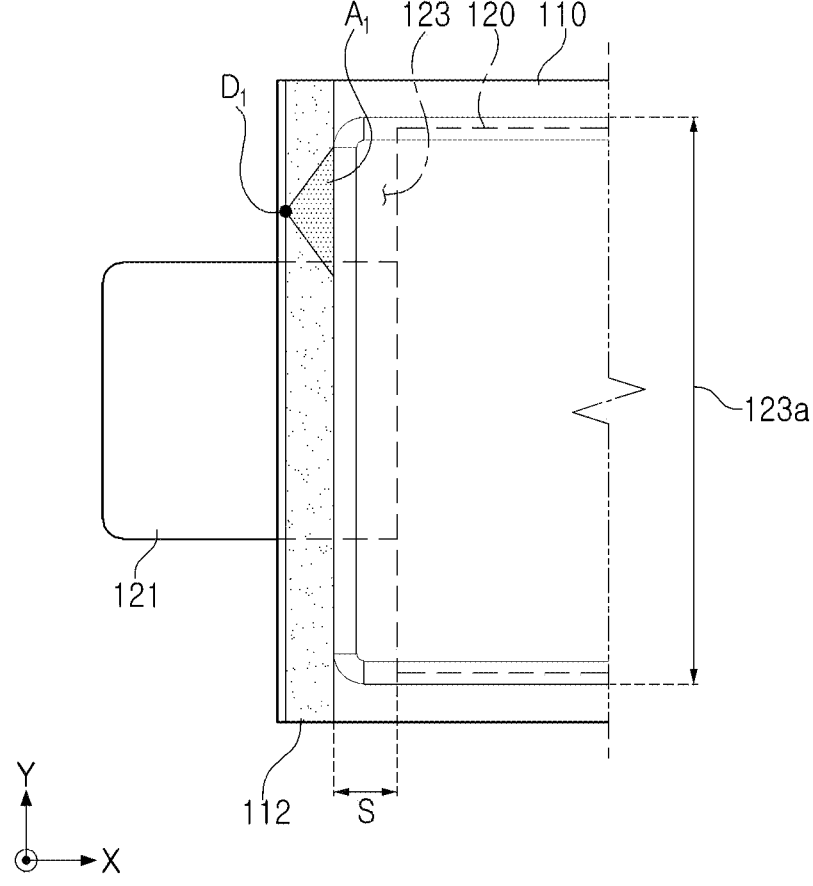
FIG. 8 schematically illustrates a gas-accommodating space inside a case to which a venting guide member is not applied.

FIG. 8 schematically illustrates a gas-accommodating space S inside a case 110 to which a venting guide member (130 in FIG. 3) is not applied.

As illustrated in FIG. 8, a width of a gas-accommodating space S in a direction, parallel to the X-axis, may have a section ranging from an end portion of a separator (not illustrated) of an electrode assembly 120 just to a first sealing portion 112 in the –X direction. The gas-accommodating space S may have the aforementioned section as a width, and a height of the gas-accommodating space S in a direction, parallel to the Y-axis, may be equal to a height 123a of an accommodation space 123 for accommodating the electrode assembly 120. However, these may be a width and a height of the gas-accommodating space S before a sealing portion releasing region $A_1$ is generated in the first sealing portion 112.

Gas generated by an electrolyte in the accommodation space 123 may be present in the gas-accommodating space S, and as a pressure thereof gradually increases, the gas may permeate into a region of the first sealing portion 112 to release a region of the first sealing portion 112, and a sealing portion releasing region $A_1$ may be formed in the first sealing portion 112.

A volume of the sealing portion releasing region $A_1$, which is a region in which the sealing is partially released in the first sealing portion 112, may gradually increase, as a pressure of the gas increases. When the pressure of the gas is concentrated in the sealing portion releasing region $A_1$, an open portion $D_1$ may be generated in the first sealing portion 112, and bonding of the first sealing portion 112 may be discontinuous in a direction, parallel to the X-axis. Then, as the sealing of the case 110 is completely released, the gas may be discharged outside the case 110. In this case, the first sealing portion 112 in which the sealing portion releasing region $A_1$ and the open portion $D_1$ are not present may not fulfill its role.

Figure 9:
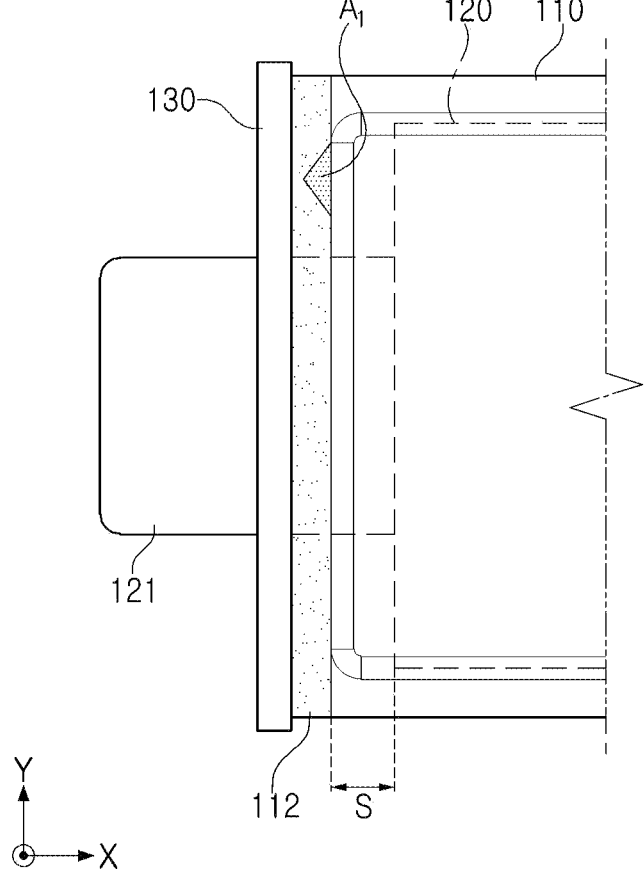
FIG. 9 schematically illustrates a gas-accommodating space inside a case to which a venting guide member is applied according to an embodiment of the present disclosure.

FIG. 9 schematically illustrates a gas-accommodating space S inside a case 110 to which a venting guide member 130 is applied according to an embodiment of the present disclosure.

Until a sealing portion releasing region $A_1$ occurs in a first sealing portion 112, a gas-accommodating space S may have a volume, equal to the volume of the gas-accommodating space S illustrated in FIG. 8.

When a pressure of gas in the gas-accommodating space S increases, the sealing portion releasing region $A_1$ may be generated in the first sealing portion 112, but a maximum width of the sealing portion releasing region $A_1$ in a direction, parallel to the X-axis, may be limited to a section ranging from from the first sealing portion 112 just to a venting guide member 130. Since the venting guide member 130 presses the first sealing portion 112, sealing of a case 110 may not be released before a pressure of the gas exceeding a pressing force of the venting guide member 130 is reached.

Figure 10:
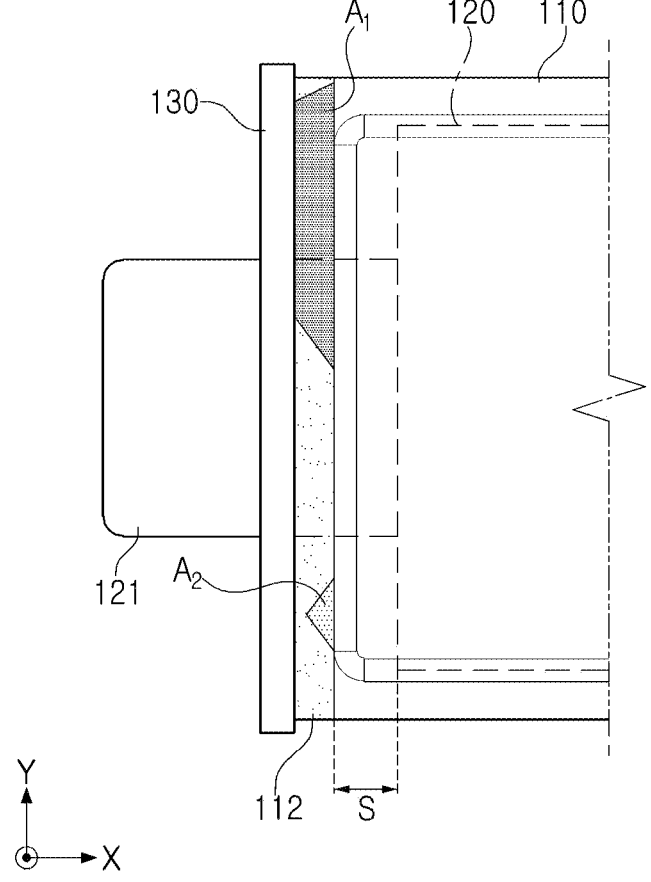
FIG. 10 schematically illustrates a gas-accommodating space inside a case to which a venting guide member is applied according to an embodiment of the present disclosure.

FIG. 10 schematically illustrates a gas-accommodating space S inside a case 110 to which a venting guide member 130 is applied according to an embodiment of the present disclosure.

As illustrated in FIG. 10, as a pressure of gas gradually increases, a volume of a sealing portion releasing region $A_1$ may also gradually increase, but a maximum width of the sealing portion releasing region $A_1$ in a direction, parallel to the X-axis, may be limited, a volume of the sealing portion releasing region $A_1$ may increase, as a height of the sealing portion releasing region $A_1$ in a direction, parallel to the Y-axis, increases.

In some cases, a second sealing portion releasing region $A_2$ may be subsequently generated in the first sealing portion 112. In this case, a sealing portion releasing region $A_1$, first generated, may be provided as a first sealing portion releasing region $A_1$.

Figure 11:
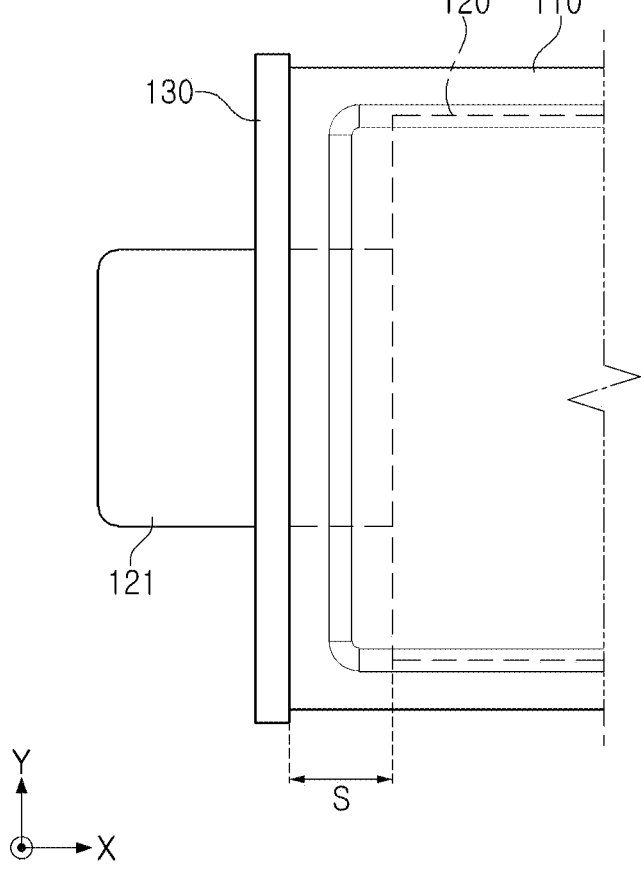
FIG. 11 schematically illustrates a gas-accommodating space inside a case to which a venting guide member is applied according to an embodiment of the present disclosure.

FIG. 11 schematically illustrates a gas-accommodating space S inside a case 110 to which a venting guide member 130 is applied according to an embodiment of the present disclosure.

As illustrated in FIG. 11, when a pressure of gas gradually increases even after a first sealing portion releasing region ($A_1$ in FIG. 10) and a second sealing portion releasing region ($A_2$ in FIG. 10) occur, bonding of a case 110 in a first sealing portion (112 in FIG. 10) may be entirely released, such that a width of a gas-accommodating space in a direction, parallel to the X-axis, becomes a value obtained by adding an initial width of the first sealing portion (112 in FIG. 10).

Therefore, according to the present disclosure, the width of the gas-accommodating space may be further increased by a width of a region in which a venting guide member 130 is not present in the first sealing portion 112. This means that an amount of gas that may be present in the gas-accommodating space increases, and that a point in time of unsealing the case 110 is delayed by the amount. According to the present disclosure as described above, gas-accommodating capacity of the case 110 of the battery cell may increase, and a point in time at which sealing of the case 110 of the battery cell is released by the gas may be also delayed.

Figure 12:
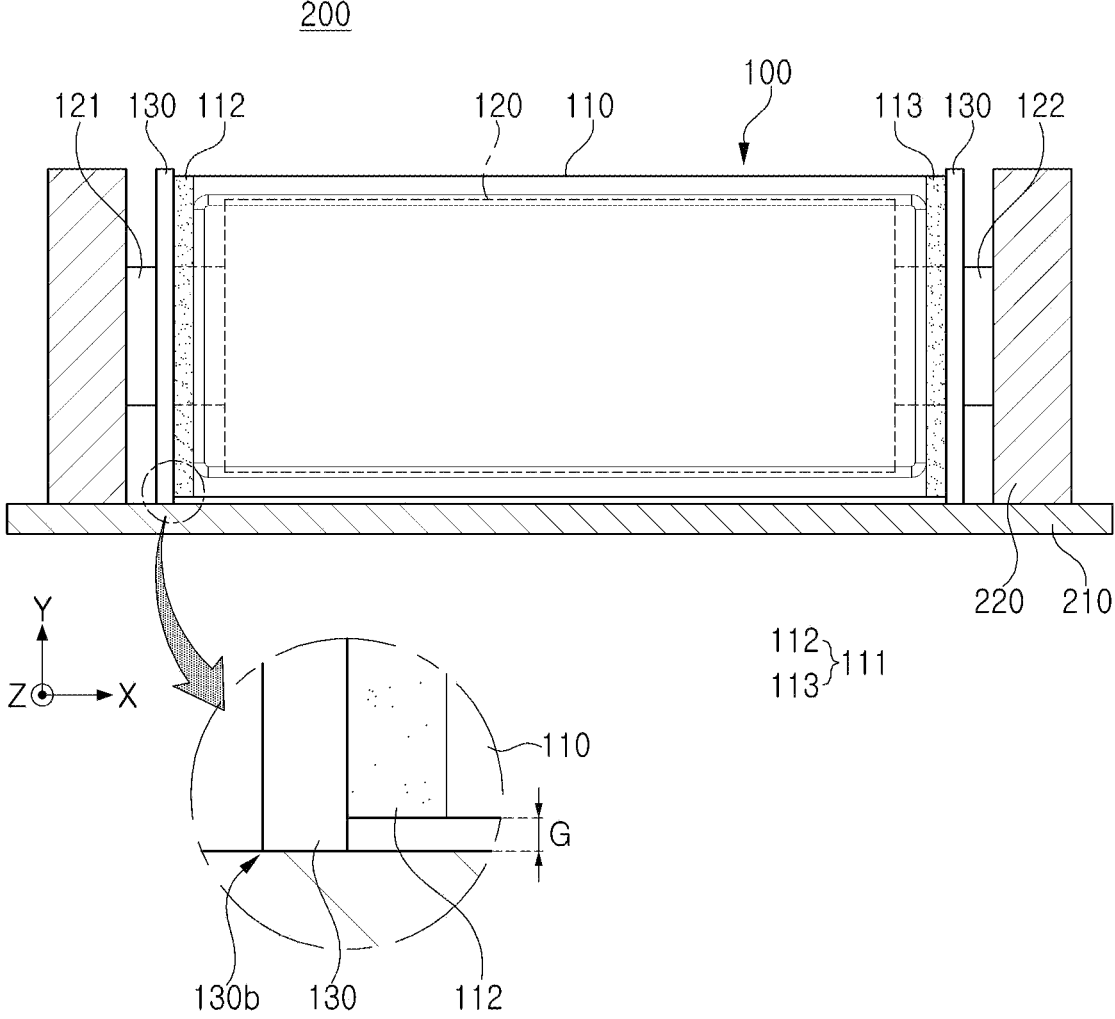
FIG. 12 schematically illustrates a portion of a battery module according to an embodiment of the present disclosure.

FIG. 12 schematically illustrates a portion of a battery module 200 according to an embodiment of the present disclosure.

As illustrated in FIG. 12, a battery module 200 according to an embodiment of the present disclosure may include a module housing 210, at least one battery cell 100 seated in the module housing 210, and a bus bar unit 220 electrically connected to a positive electrode tab 121 and a negative electrode tab 122 of the battery cell 100.

The battery cell 100 may be provided as a plurality of battery cells 100 according to capacity of the battery module 200, and the plurality of battery cells 100 may be stacked in a direction, parallel to the Z-axis. In this case, the bus bar unit 220 may also extend in a direction, parallel to the Z-axis, and the positive electrode tab 121 and the negative electrode tab 122 of the battery cell 100 may be electrically connected to the bus bar unit 220.

The bus bar unit 220 may include a bus bar member (not illustrated) to which the positive electrode tab 121 and the negative electrode tab 122 are welded, and a bus bar frame (not illustrated) supporting the bus bar member, but is not limited by the present disclosure, and may be appropriately selected and applied according to standards of the battery module 200, specifications required for the battery module 200, or the like.

A material such as a thermal resin may be applied between the battery cell 100 and the module housing 210, and a cooling member (not illustrated) for cooling may be provided in the module housing 210.

In an embodiment of the present disclosure, a venting guide member 130 of the battery cell 100 may be provided as a plurality of venting guide members 130, and the plurality of venting guide members 130 may be coupled to a case 110 to press a first sealing portion 112 and a second sealing portion 113.

The venting guide member 130 may extend in a direction, parallel to the Y-axis. The other end portion 130*b* of the venting guide member 130 may be present outside the case 110, and may be in contact with the module housing 210. This may correspond to the plurality of venting guide members 130 pressing the first sealing portion 112 and the second sealing portion 113.

The other end portion 130*b* of the venting guide member 130 may be in contact with the module housing 210, such that the case 110 of the battery cell 100 may not be in contact with the module housing 210, and a gap G may be present between the case 110 and the module housing 210.

The gap G may serve to separate the case 110 from the module housing 210, and may be a space in which an electrolyte flowing out of the case 110 exists. The electrolyte flowing out of the case 110 may be a medium for energization. Therefore, it is possible to contribute to preventing dielectric breakdown by accommodating the electrolyte in the gap G and preventing the electrolyte from coming into contact with the case 110 from the outside of the case 110.

However, the case 110 may be in direct contact with the module housing 210 according to specifications required for the battery module 200, standards of the battery module 200, or the like, which is not necessarily limited by the present disclosure.

According to the present disclosure, gas-accommodating capacity of a case of a battery cell may increase.

In addition, according to the present disclosure, unsealing of a case of a battery cell may be delayed by gas.

While example embodiments have been illustrated and described above, it will be apparent to those skilled in the art that modifications and variations could be made without departing from the scope of the present disclosure as defined by the appended claims.

What is claimed is:

1. A battery cell comprising:
a case;
an electrode assembly including a positive electrode, a negative electrode, and a separator, accommodated in the case; and
at least one venting guide member having a guide groove therein into which a sealing portion of the case is at least partially inserted, and pressing the case to delay opening of the case,
wherein the sealing portion of the case is formed by overlapping and heat sealing of both surfaces of the case, and
wherein the electrode assembly further comprises:
a positive electrode tab connected to the positive electrode and drawn out of the case in one direction; and
a negative electrode tab connected to the negative electrode and drawn out of the case in a direction different from the one direction of the positive electrode tab,
wherein the sealing portion of the case comprises:

a first sealing portion formed on a surface of the case from which the positive electrode tab is drawn out, the first sealing portion having different bonding forces between a region facing the positive electrode tab and a region not facing the positive electrode tab;
a second sealing portion formed on a surface of the case from which the negative electrode tab is drawn out, the second sealing portion having different bonding forces between a region facing the negative electrode tab and a region not facing the negative electrode tab,
wherein the at least one venting guide member reinforces and presses at least one of a region of the first sealing portion having a relatively weaker bonding force and a region of the second sealing portion having a relatively weaker bonding force.

2. The battery cell of claim 1,
wherein the at least one venting guide member is coupled to the case, to insert at least one of the first sealing portion or the second sealing portion into the guide groove.

3. The battery cell of claim 2, wherein the at least one venting guide member is coupled to the case such that a region thereof at least partially faces at least one of the positive electrode tab or the negative electrode tab.

4. The battery cell of claim 3, wherein the at least one venting guide member is coupled to the case such that end portions of the venting guide member are present on the case in a cross-section taken in a width-height direction of the case.

5. The battery cell of claim 2, wherein a plurality of the venting guide member are spaced apart from each other to sandwich the positive electrode tab and the negative electrode tab therebetween, and are coupled to the case.

6. The battery cell of claim 2, wherein, in the at least one venting guide member, a region thereof at least partially faces at least one of the positive electrode tab or the negative electrode tab, and end portions of the venting guide member extend in an outer circumferential direction of the case in a cross-section taken in a width-height direction of the case, such that the end portions are present outside of the case.

7. The battery cell of claim 2, wherein the at least one venting guide member has a pair of the guide groove, and further comprises a tab lead-out hole provided therein to be positioned between the pair of guide grooves, and through which at least one of the positive electrode tab or the negative electrode tab passes.

8. The battery cell of claim 7, wherein the guide groove has an intermediate forcedly fitting tolerance or a loose forcedly fitting tolerance with the case, and the tab lead-out hole has an intermediate forcedly fitting tolerance or a loose forcedly fitting tolerance with at least one of the positive electrode tab or the negative electrode tab.

\* \* \* \* \*